(12) United States Patent
Naveh et al.

(10) Patent No.: US 8,281,083 B2
(45) Date of Patent: Oct. 2, 2012

(54) DEVICE, SYSTEM AND METHOD OF GENERATING AN EXECUTION INSTRUCTION BASED ON A MEMORY-ACCESS INSTRUCTION

(75) Inventors: Alon Naveh, Ramat Hasharon (IL); Eliezer Weissmann, Haifa (IL); Itamar Kazachinsky, Natanya (IL); Iris Sorani, Nahariya (IL); Yair Kazarinov, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 11/170,115

(22) Filed: Jun. 30, 2005

(65) Prior Publication Data

US 2007/0005910 A1    Jan. 4, 2007

(51) Int. Cl.
*G06F 13/12* (2006.01)
(52) U.S. Cl. ........................................ 711/154; 711/200
(58) Field of Classification Search .................. 713/323; 711/200, 154
See application file for complete search history.

(56) References Cited

U.S. PATENT DOCUMENTS

| | | | |
|---|---|---|---|
| 6,360,327 B1 * | 3/2002 | Hobson ..................... | 713/300 |
| 6,425,086 B1 | 7/2002 | Clark et al. | |
| 7,386,688 B2 * | 6/2008 | McMahan et al. ........... | 711/153 |
| 2003/0163599 A1 * | 8/2003 | Hills et al. ................. | 709/318 |
| 2006/0053326 A1 * | 3/2006 | Naveh et al. ............... | 713/323 |
| 2006/0075060 A1 * | 4/2006 | Clark ......................... | 709/213 |

FOREIGN PATENT DOCUMENTS

| | | |
|---|---|---|
| JP | 2000-20318 | 7/1998 |
| JP | 2004-326236 | 4/2003 |

OTHER PUBLICATIONS

"Prescott new Instructions Software Developer's Guide" 2003 Intel Corporation; entire document with focus on 1-1 to 1-3, 2-2; 3-26 to 3-28; 3-38 to 3-40.*
"Advanced Configuration and Power Interface Specification" Revision 2.0b Oct. 11, 2002; Compaq Computer Corporation, Intel Corporation, Microsoft Corporation, Pheonix Technologies Ltd, Toshiba Corporation. entire document with focus on 198-199; 219-228.*
The Merriam Webster dictionary, 2005, Merriam Webster Inc. 11th edition. p. 251.*
"Advanced Configuration and Power Interface Specification" Compaq Computer Corporation, Intel Corporation, Microsoft Corporation, Phoenix Technologies Ltd., Toshiba Corporation; Revision 2.0; Jul. 27, 2000; p. I-XIVC & 1-467.
"IA-32 Intel Architecture Software Developer's Manual" vol. 2A, Instruction set Ref. A-M, 2004 Intel Corporation; entire document.
Japanese Patent Office, Office Action mailed Nov. 17, 2009 in Japanese patent application No. 2006-180086.
Japanese Patent Office, Office Action mailed Mar. 29, 2011 in Japanese application No. 2006-180086.
Japanese Patent Office, Decision of Refusal mailed Oct. 12, 2010 in Japanese patent application No. 2006-180086.

* cited by examiner

*Primary Examiner* — Kenneth Lo
(74) *Attorney, Agent, or Firm* — Trop, Pruner & Hu, P.C.

(57) ABSTRACT

Embodiments of the present invention provide an apparatus, system, and method of generating an execution instruction. Some demonstrative embodiments my include generating an execution instruction of a predetermined executable format based on memory address data of a memory-access instruction representing a memory address. Other embodiments are described and claimed.

20 Claims, 4 Drawing Sheets

DEVICE, SYSTEM AND METHOD OF GENERATING AN EXECUTION INSTRUCTION BASED ON A MEMORY-ACCESS INSTRUCTION

BACKGROUND OF THE INVENTION

Power management operations may relate, for example, to core clocking control, active state operation, idle state control, and/or thermal control, e.g., as defined by the Advanced Configuration and Power Interface (ACPI) specification.

Conventional computing platforms may execute an operating system, which may be able to activate a power management operation by generating an Input/Output-mapped transaction indicating a memory address representing the operation to be activated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
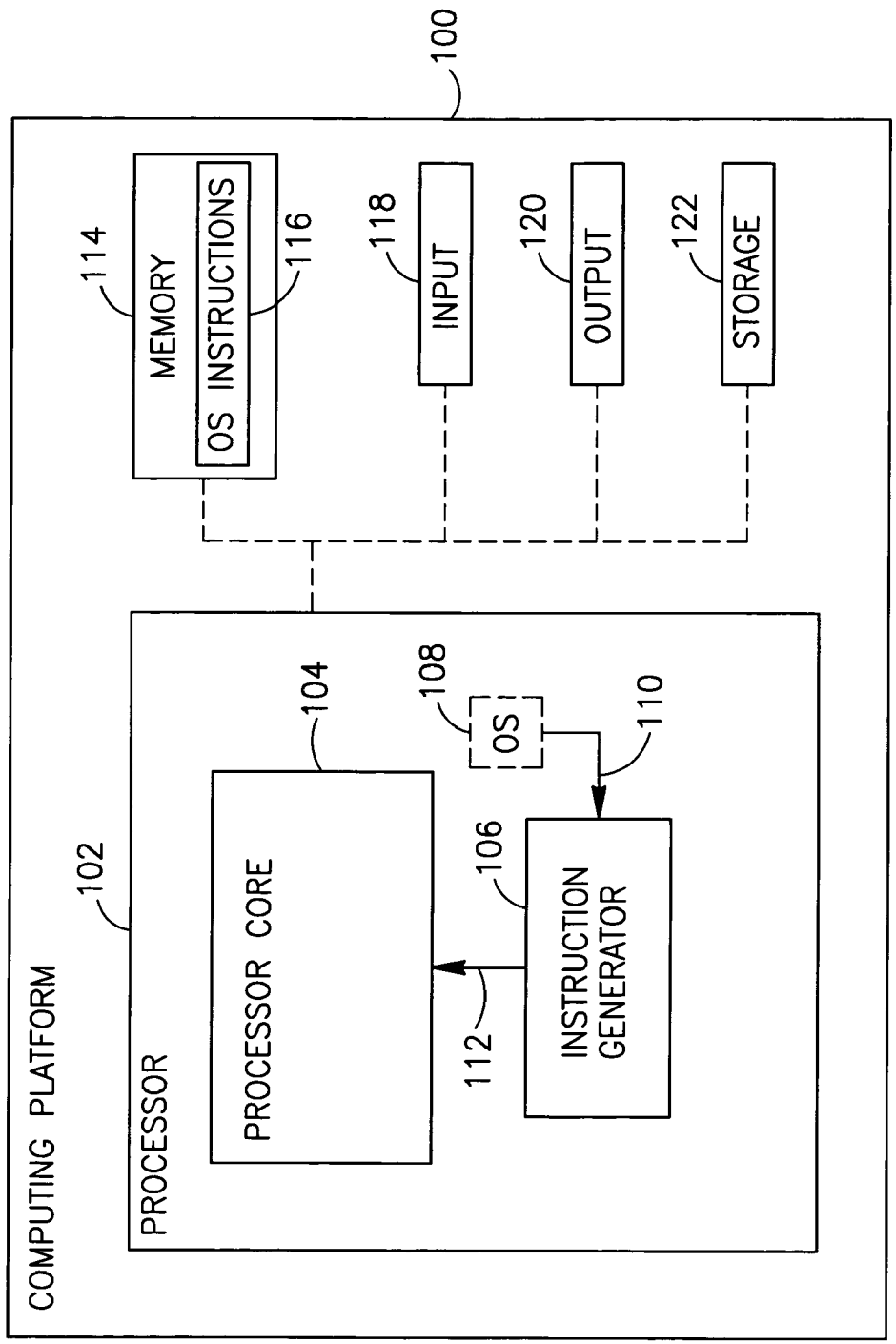
FIG. 1 is a schematic illustration of a computing platform including an execution instruction generator in accordance with some demonstrative embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The phrase "memory-access instruction" as used herein may refer to an instruction, command, order, and/or function for accessing one or more memory addresses, e.g., by writing to and/or reading from the one or more memory addresses. In some demonstrative embodiments of the invention, the memory-access instruction may include an Input/Output (I/O) mapped transaction instruction, e.g., as is known in the art. In some demonstrative embodiments of the invention, the memory-access instruction may be generated by an Operating System (OS) and/or any other suitable module, and may include, for example, an I/O mapped instruction as defined by the Advanced Configuration and Power Interface (ACPI) specification, Revision 2.0, Published Jul. 27, 2000. The memory-access instruction may indicate a desired operation, e.g., a core clocking control operation, an active state control operation (also referred to as a "P-state operation"), an idle state control operation (also referred to as a "C-state operation"), a thermal control operation, and/or any other suitable operation to be performed, for example, as part of a control scheme, e.g., a power management control scheme, and/or a power optimization control scheme, as are defined by the ACPI specification. For example, the memory-access instruction may include address data corresponding to a memory address, which may represent the desired operation.

The phrase "execution instruction" as used herein may refer to an instruction, command, order, and/or function of a type and/or format executable by a processor, e.g., by one or more logical elements of the processor. In some exemplary embodiments of the invention, the execution instruction may include a Monitor Wait (MWAIT) instruction, e.g., as defined by the IA-32 Intel® Architecture Software Developer's Manual, Volume 2A: Instruction Set Reference A-M, Published April 2005. The MWAIT instruction may relate, for example, to a desired C-state operation. For example, the MWAIT instruction may include a target C-state parameter representing a desired C-state operation. For example, a C-1 state may relate to an executing state, a C-2 state may relate to a low power saving state, a C-3 state may relate to a medium power saving state, a C-4 state may relate to a high power saving state, e.g., as are defined by the ACPI specification.

Some demonstrative embodiments of the invention include a device, system, and/or method of generating an execution instruction of a predetermined executable format based on address data of a received memory-access instruction, as described in detail below. In some demonstrative embodiments of the invention the memory-address instruction may be at least partially converted into the execution instruction, e.g., as described below.

Reference is made to FIG. 1, which schematically illustrates a computing platform 100 in accordance with some demonstrative embodiments of the invention.

In some embodiments of the invention, computing platform 100 may include or may be a portable computing platform, which may be, for example, powered by a portable power source, e.g., a battery. In other embodiments of the invention, computing platform 100 may include or may be a non-portable computing platform.

Although the invention is not limited in this respect, platform 100 may include or may be, for example, a personal computer, a desktop computer, a mobile computer, a laptop computer, a notebook computer, a terminal, a workstation, a server computer, a Personal Digital Assistant (PDA) device, a tablet computer, a network device, a micro-controller, a cellular phone, a camera, or any other suitable computing and/or communication device.

According to some demonstrative embodiments of the invention, platform 100 may include a processor 102. Processor 102 may include, for example, a Central Processing Unit (CPU), a Digital Signal Processor (DSP), a microprocessor, a host processor, a plurality of processors, a controller, a chip, a microchip, or any other suitable multi-purpose or specific processor or controller. Processor 101 may include a processor core 104, e.g., including one or more Arithmetic Logic Units (ALUs) as are known in the art.

According to some demonstrative embodiments of the invention, platform 100 may also include an input unit 118, an output unit 120, a memory unit 114, and/or a storage unit 122. Platform 100 may additionally include other suitable hardware components and/or software components.

Input unit 118 may include, for example, a keyboard, a mouse, a touch-pad, or other suitable pointing device or input device. Output unit 120 may include, for example, a Cathode Ray Tube (CRT) monitor, a Liquid Crystal Display (LCD) monitor, or other suitable monitor or display unit.

Storage unit 122 may include, for example, a hard disk drive, a floppy disk drive, a Compact Disk (CD) drive, a CD-Recordable (CD-R) drive, or other suitable removable and/or fixed storage unit.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

According to some demonstrative embodiments of the invention, memory unit 114 may store, for example, one or more OS instructions 116. When executed by processor 102, OS instructions 116 may result in an OS application 108, e.g., as is known in the art. OS 108 may generate at least one memory-access instruction 110, for example, as part of a power management control scheme, e.g., according to the ACPI specification. Memory-access instruction 110 may include, for example, an I/O read instruction including address data corresponding to a memory address, e.g., of memory 114, which may represent a predetermined operation. The predetermined operation may include, for example, a power management/optimization operation, e.g., a C-state operation. Accordingly, the address data may correspond to an address data of memory 114 representing a C-state operation to be performed.

According to some demonstrative embodiments of the invention, processor 102 may include an execution instruction generator 106 to generate an execution instruction 112, e.g., of a predetermined format executable by processor core 104, based on the address data of memory-access instruction 110. For example, instruction generator 106 may generate an MWAIT instruction corresponding to the address data of memory-access instruction 110, e.g., as described below.

Aspects of the invention are described herein in the context of a demonstrative embodiment of a computing platform, e.g., computing platform 100, including an instruction generator, e.g., generator 106, being part of a processor, e.g., processor 102. However, it will be appreciated by those skilled in the art that, according to other embodiments of the invention, the instruction generator and the processor may be separate parts of the computing platform.

Figure 2:
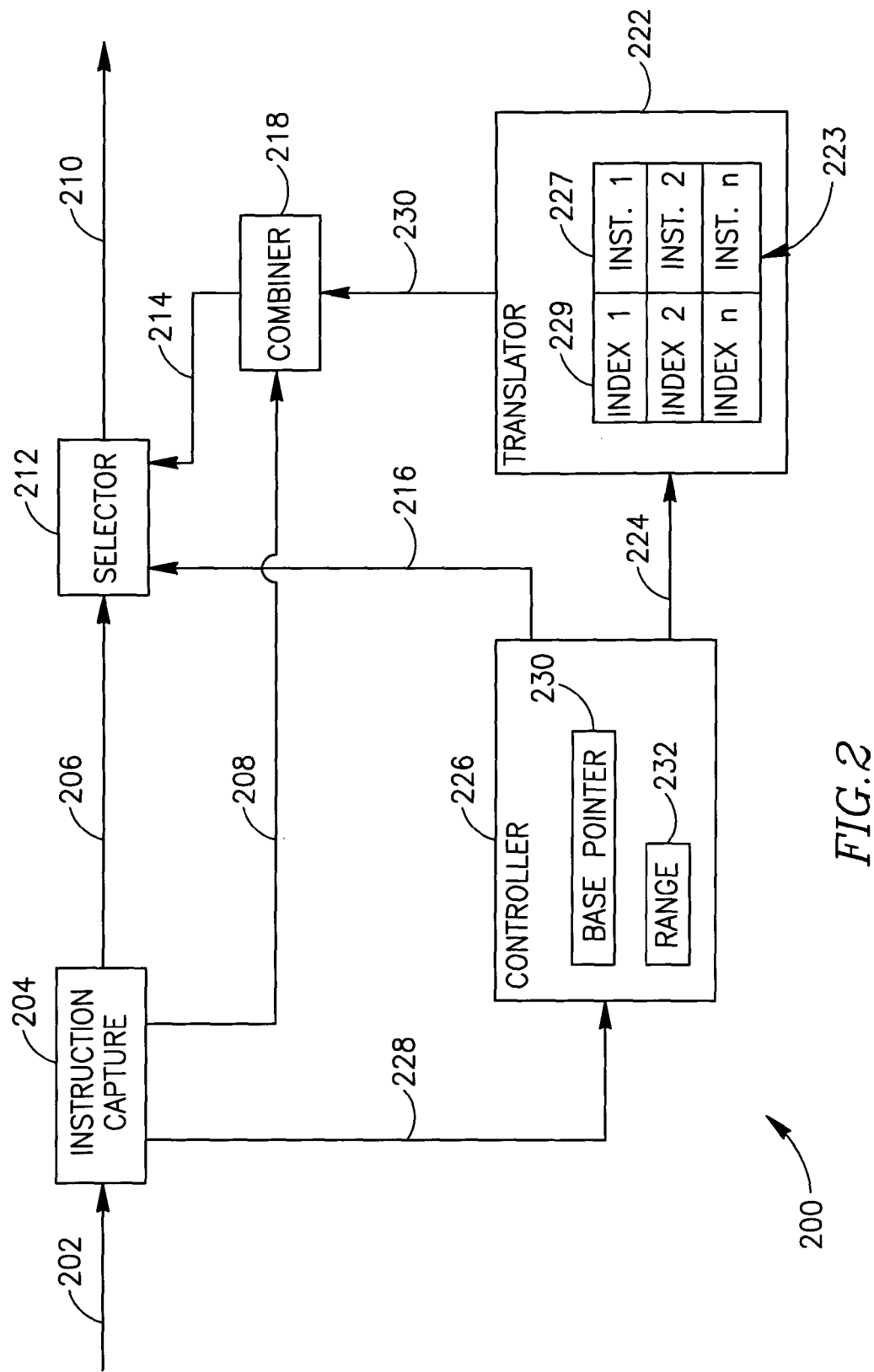
FIG. 2 is a schematic illustration of an execution instruction generator in accordance with one demonstrative embodiment of the invention.

Reference is made to FIG. 2, which schematically illustrates an instruction generator 200 in accordance with a demonstrative embodiment of the invention. Although the invention is not limited in this respect, instruction generator 200 may perform the functionality of instruction generator 106 (FIG. 1).

According to some demonstrative embodiments of the invention, instruction generator 200 may include an instruction capture module 204 to capture ("flag") a received memory-access instruction signal 202. Memory-access instruction signal 202 may include, for example, address data, e.g., corresponding to an address of memory 114 (FIG. 1). Memory-access instruction 202 may also include any suitable non-address data, e.g., including instruction data, and/or instruction parameters, e.g., as are known in the art. Instruction capture module 204 may generate a signal 206 substantially identical to memory-access instruction signal 202, and a signal 228 including the address data of instruction signal 202. Capture module 204 may also generate a signal 208 including at least part of the non-address data of instruction signal 202.

According to some demonstrative embodiments of the invention, instruction generator 200 may generate an instruction signal 210 to be provided, for example, to processor core 104 (FIG. 1), based on the address data of memory-access instruction signal 202, e.g., as described below.

In some demonstrative embodiments of the invention instruction generator 200 may selectively generate instruction signal 210 including either memory-access instruction 202, or an execution instruction 214 corresponding to the address data of memory-access instruction 202, e.g., based on the address data of memory-access instruction 202 as described below.

According to some demonstrative embodiments of the invention, instruction generator 200 may also include a controller 226, a translator 222, a combiner 218, and/or a selector 212, as are described below.

According to some demonstrative embodiments of the invention, controller 226 may determine whether the address data of memory-access instruction 202 corresponds to one or more predetermined execution instructions, e.g., as described below.

According to some demonstrative embodiments of the invention, controller 226 may compare the address data of signal 228 to predetermined address data of a set of one or more memory addresses corresponding to the one or more predetermined execution instructions. For example, the one or more predetermined execution instructions may be represented by a sequence of memory addresses, e.g., of memory 114 (FIG. 1). The sequence of memory addresses may be defined, for example, by a base pointer value 230 corresponding to a first memory address of the sequence of memory addresses, and a range value 232 corresponding to a number of addresses in the sequence. It will be appreciated by those skilled in the art that in other embodiments of the invention the sequence of memory addresses may be defined in any other suitable way. For example, the sequence of memory addresses may be defined by base pointer value 230 and an end pointer corresponding to a last address in the sequence of addresses.

Although some demonstrative embodiments of the invention are described herein with relation to one or more execution instructions represented by a sequence of memory addresses, it will be appreciated by those skilled in the art that in other embodiments of the invention the one or more execution instructions may be represented by any other desired configuration of memory addresses, e.g., a non-sequential set of memory addresses.

According to some demonstrative embodiments of the invention, controller 226 may compare the address data of signal 228 to the values of base pointer value 230 and/or range value 232. Controller 226 may determine whether memory-access instruction 202 corresponds to one of the predetermined execution instructions, e.g., based on the comparison between the memory address data of signal 228, and base pointer value 230 and/or range value 232. For example, controller 226 may determine that memory-access instruction 202 corresponds to one of the predetermined execution instructions, if the address data of signal 228 corresponds to an address value, which is equal to or bigger than base pointer value 230; and equal to or smaller than the sum of base pointer value 230 and range value 232.

According to some demonstrative embodiments of the invention, instruction generator 200 may be able to determine at least one execution-instruction parameter 220 corresponding to an operation represented by the address data of signal 228, for example, if controller 226 determines that memory-access instruction 202 corresponds to one of the predetermined execution instructions e.g., as described below.

According to some demonstrative embodiments of the invention, translator 222 may translate the memory address represented by memory access signal 202 into execution-instruction parameter 220. For example, translator 222 may include a table, e.g., a Look-Up-Table (LUT) 223, including a set of predetermined execution instruction parameters 227, e.g., C-state parameters, identified by a set of index values 229. Controller 226 may generate an index signal 224 having a value corresponding to one of index values 229 indicating an execution instruction parameter, e.g., corresponding to the memory address of signal 202. For example, parameters 227 may be arranged according to the order of the memory addresses representing the execution instructions corresponding to parameters 227. According to this example, index values 229 may include a predetermined sequence of values, e.g., the sequence 1, 2, 3 . . . . Accordingly, controller 226 may generate index signal 224 having a value corresponding to a difference between the address value of signal 228 and base pointer value 230.

In one demonstrative embodiment of the invention, the one or more predetermined execution instructions may include N execution instructions represented by a sequence of N memory addresses n, n+1, n+2 . . . n+N−1, respectively. Accordingly, table 223 may include N instruction parameters 227 identified by N respective index values 229 having the values i, i+1, i+2, . . . i+N−1, e.g., wherein i=1 or any other desired number. Thus, controller 226 may generate index signal 224, e.g., having a value j=m−bp+i, wherein m denotes the memory address of signal 228, and bp denotes base pointer value 230.

According to some demonstrative embodiments of the invention, combiner 218 may generate execution instruction 214 by combining execution-instruction parameter 220 with the non-address data of signal 208. Combiner 218 may implement any suitable combining method, e.g., depending on a type of parameter 220 and/or the non-address data of signal 208.

According to some demonstrative embodiments of the invention, controller 226 may control selector 212, e.g., using a control signal 216, to selectively generate instruction signal 210 including either execution instruction 214, or the memory-access instruction of signal 206. For example, controller 226 may control selector 212 to generate instruction signal 210 including execution instruction 214, e.g., if controller 226 determines the memory address data of memory-access instruction 202 corresponds to one of the predetermined execution instructions; and to generate instruction signal 210 including memory access instruction 202, e.g., if controller 226 determines the memory address data of memory-access instruction 202 does not correspond to any one of the predetermined execution instructions.

Referring back to FIG. 1, in some demonstrative embodiments of the invention, processor core 104 may be able to execute one or more MWAIT instructions, e.g., for activating corresponding C-state operations. The MWAIT instruction may include an MWAIT(Target C-state) instruction relating to a target C-state, e.g., in accordance with the ACPI specification. In these exemplary embodiments of the invention, instruction generator 106 may be able to generate execution instruction 112 including an MWAIT(Target C-state) corresponding to the target C-state represented by memory-access instruction 110, e.g., as described below.

Figure 3:
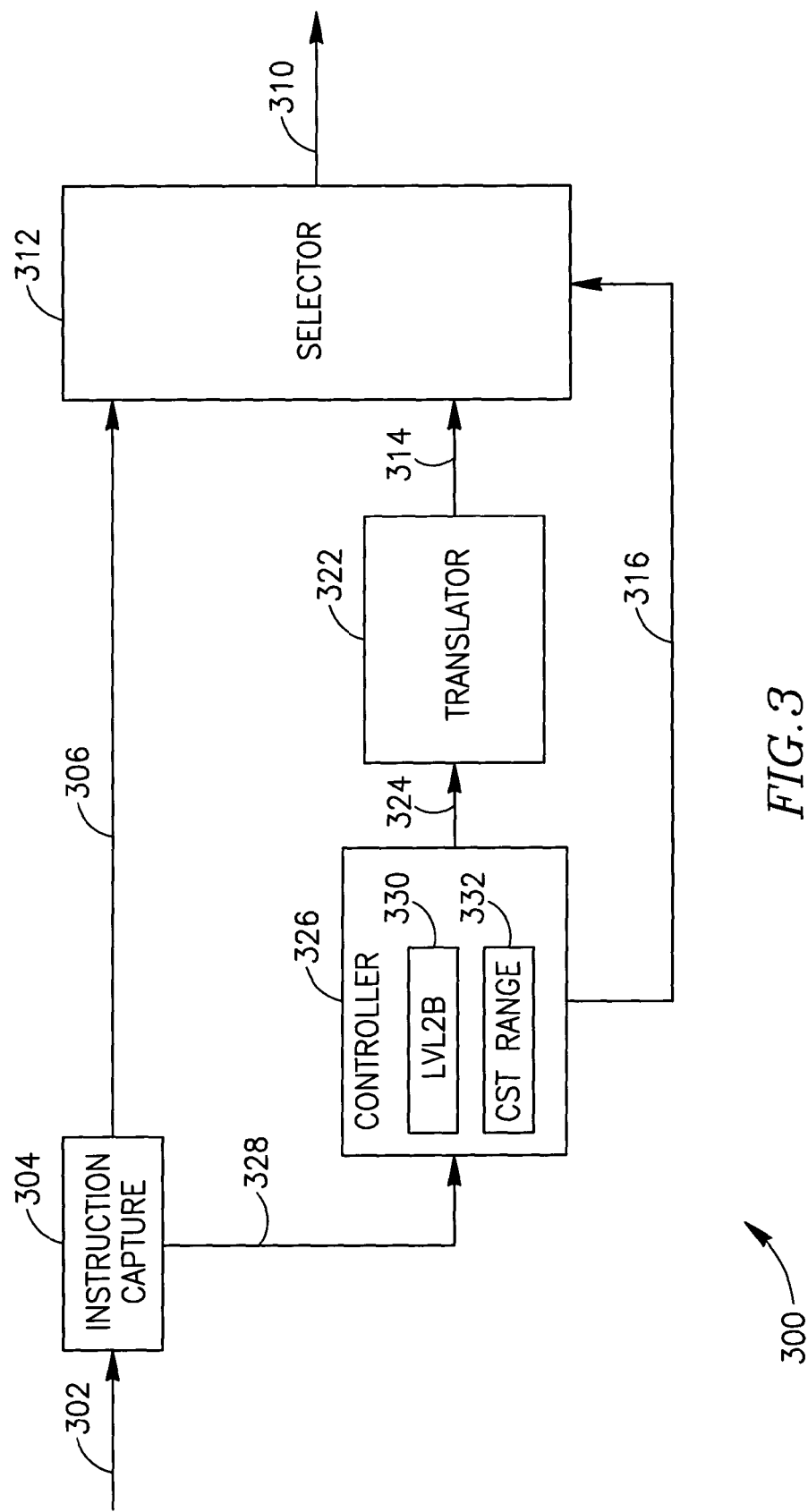
FIG. 3 is a schematic illustration of an execution instruction generator in accordance with another demonstrative embodiment of the invention.

Reference is now made to FIG. 3, which schematically illustrates an instruction generator 300 in accordance with another demonstrative embodiment of the invention. Although the invention is not limited in this respect, instruction generator 300 may perform the functionality of instruction generator 106 (FIG. 1).

According to some demonstrative embodiments of the invention, instruction generator 300 may generate an instruction signal 310, e.g., to be provided to processor core 104 (FIG. 1), based on the address data of a memory-access instruction signal 302. In some demonstrative embodiments of the invention instruction generator 300 may selectively generate instruction signal 310 including either memory-access instruction 302, or an MWAIT instruction 314 corresponding to the address data of memory-access instruction 302, e.g., based on the address data of memory access instruction 302, as described below.

According to some demonstrative embodiments of the invention, instruction generator 300 may include an instruction capture module 304 to flag memory-access instruction signal 302. Memory-access instruction signal 302 may include, for example, address data, e.g., corresponding to an address of memory 114 (FIG. 1). Instruction capture module 304 may generate a signal 306 substantially identical to memory-access instruction signal 302; and a signal 328 including the address data of instruction signal 302.

According to some demonstrative embodiments of the invention, instruction generator 300 may also include a controller 326, a translator 322, and/or a selector 312, as are described below.

According to some demonstrative embodiments of the invention, controller 326 may determine whether the address data of memory-access instruction 302 corresponds to one or more predetermined MWAIT instructions, respectively, e.g., as described below.

According to some demonstrative embodiments of the invention, controller 326 may compare the address data of signal 328 to predetermined address data of a set of one or more memory addresses corresponding to the one or more MWAIT instructions. In one exemplary embodiment, the one or more MWAIT instructions may be represented by a sequence of memory addresses, e.g., of memory 114 (FIG. 1). The sequence of memory addresses may be defined, for example, by a Level two Base point ("LVL2B") value 330 corresponding to a memory address representing a C-2 state operation; and a C-state Range ("CST_RANGE") value 332 corresponding to a number of addresses in the sequence of memory addresses.

According to some demonstrative embodiments of the invention, controller 326 may determine whether memory-access instruction 302 corresponds to one of the MWAIT instructions, e.g., based on the comparison between the memory address data of signal 328; and LVL2B value 330, and/or CST_RANGE value 332. For example, controller 326 may determine that memory-access instruction 302 corresponds to one of the MWAIT instructions, if the address data of signal 328 corresponds to an address value, which is equal to or bigger than LVL2B value 330; and equal to or smaller than the sum of LVL2B value 330 and CST_RANGE value 332.

According to some demonstrative embodiments of the invention, translator 322 may translate the memory address represented by memory access instruction 302 into MWAIT instruction 314. For example, controller 326 may generate an index signal 324 having a value indicating a c-state parameter represented by the memory address data of memory-access instruction 302, and translator 322 may generate MWAIT instruction 314 based on index signal 324.

In one demonstrative embodiment of the invention, the one or more MWAIT instructions may include N' MWAIT instructions represented by a sequence of N' memory addresses n', n'+1, n'+2 . . . n'+N'−1, respectively. For example, the MWAIT instructions may include three MWAIT instructions corresponding to the states C-2, C-3, and C4, respectively. Accordingly, controller 326 may generate index signal 324, e.g., having a value m'−L, wherein m' denotes the memory address of signal 328, and L denotes the value of LVL2B 330. Translator 322 may generate MWAIT instruction 314 corresponding to the state j'+2, wherein j' denotes the value of index 324.

According to some demonstrative embodiments of the invention, controller 326 may control selector 312, e.g., using a control signal 316, to selectively generate instruction signal 310 including either MWAIT instruction 314, or the memory-access instruction of signal 306. For example, controller 326 may control selector 312 to generate instruction signal 310 including execution instruction 314, e.g., if controller 326 determines the memory address data of memory-access instruction 302 corresponds to one of the predetermined MWAIT instructions; and to generate instruction signal 310 including memory access instruction 302, e.g., if controller 326 determines the memory address data of memory-access instruction 302 does not correspond to any one of the predetermined execution instructions.

Although the scope of the present invention is not limited in this respect, some demonstrative embodiments of the invention may relate to an instruction generator, e.g., instruction generator 300, able to generate an execution instruction, for example, in compliance with one or more energy conservation schemes, e.g., a power optimization scheme, and/or a power management scheme. However, it will be appreciated by those with ordinary skill in the art that other embodiments of the invention may include an execution instruction generator, which may able to generate an execution instruction compliance with any other suitable scheme, for example, a temperature scheme, a frequency scheme, and/or a voltage scaling scheme, e.g., as are known in the art.

Figure 4:
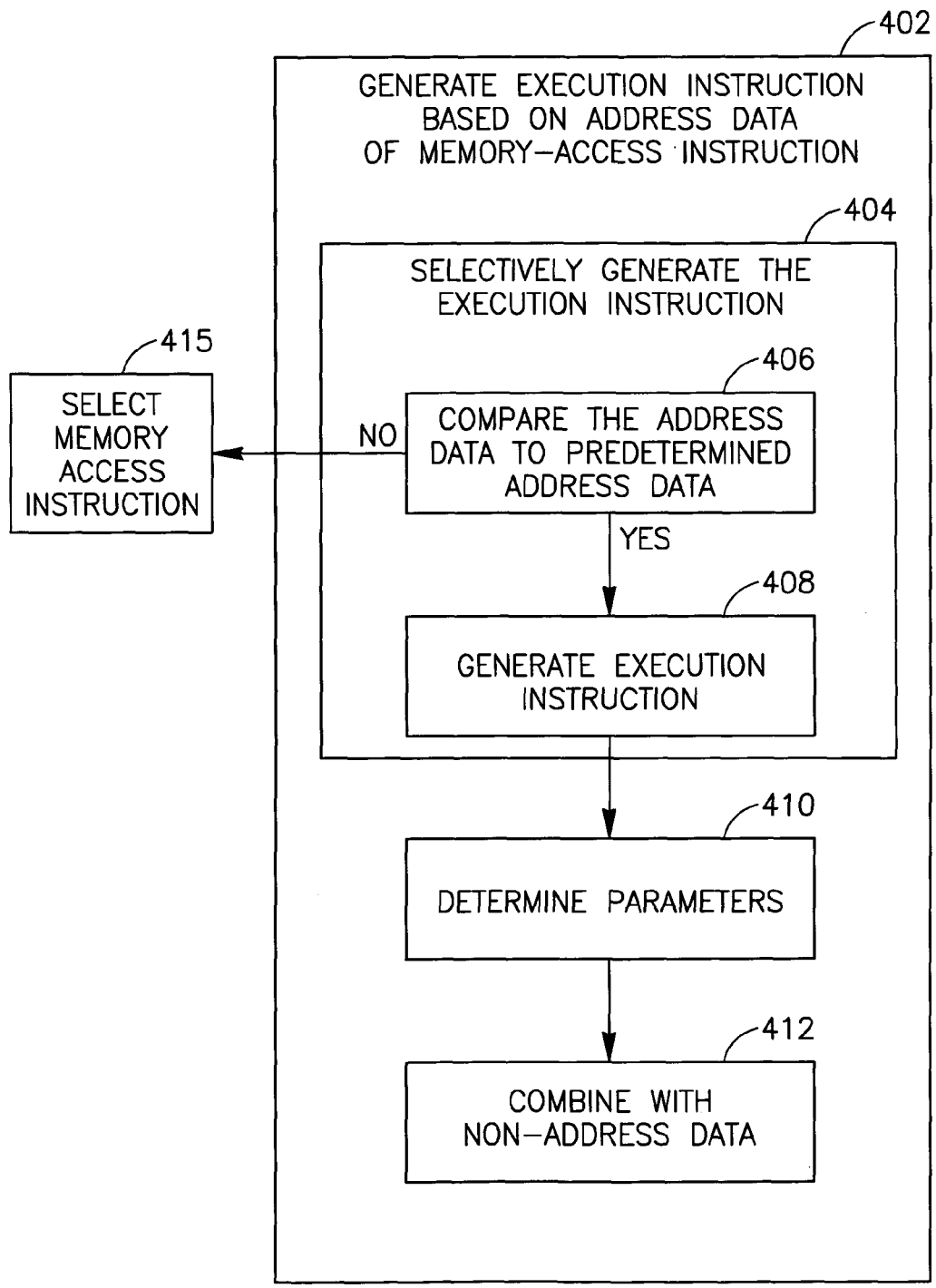
FIG. 4 is a schematic flowchart illustration of a method of generating an execution instruction in accordance with some demonstrative embodiments of the invention.

Reference is now made to FIG. 4, which schematically illustrates a method of generating an execution instruction in accordance with some demonstrative embodiments of the invention.

As indicated at block 402, the method may include generating an execution instruction of a predetermined executable format based on address data of a received memory-access instruction representing a memory address. Generating the execution instruction based on the address data of the received memory-access instruction may include, for example, generating the execution instruction based on address data of a received input/output mapped instruction for accessing the memory address.

As indicated at block 404, generating the execution instruction may include, for example, selectively generating the execution instruction based on the address data. For example, the method may include comparing the address data of the memory-access instruction to predetermined address data of a set of one or more memory addresses corresponding to one or more predetermined execution instructions, as indicated at block 406. The method may also include generating the execution instruction, e.g., if the address data of the memory-access instruction matches the address data of one of the set of memory addresses, as indicated at block 408. The method may include selecting the memory-access instruction, e.g., if the address data of the memory-access instruction does not match the address data of one of the set of memory addresses, as indicated at block 415.

As indicated at block 410, generating the execution instruction may include determining one or more parameters of the execution instruction based on the address data. Generating the execution instruction may include combining the one or more parameters of the execution instruction with non-address data of the memory-access instruction, as indicated at block 412.

Embodiments of the present invention may be implemented by software, by hardware, by firmware, or by any combination of software, hardware, and/or firmware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
  an instruction generator to receive a memory-access instruction including address data and non-address data and to compare the address data to an address range defined by a base pointer value and a range value, and generate an index signal having a value corresponding to one of a set of index values stored in a table that includes a set of execution instruction parameters identified by the set of index values, and to combine the non-address data and the execution instruction parameter indexed by the memory-access instruction and obtained from the table to generate an execution instruction if the address data of the memory-access instruction corresponds to one of the set of execution instructions; and
  a core coupled to the instruction generator to receive the execution instruction or the memory-access instruction from the instruction generator and to execute the received execution instruction or memory-access instruction.

2. The apparatus of claim 1, wherein the memory-access instruction comprises an input/output mapped instruction to access a memory address of a memory.

3. The apparatus of claim 1, wherein the instruction generator comprises:
  a controller to determine if the address data corresponds to an address value equal to or greater than a base pointer value and equal to or less than a sum of the base pointer value and a range value, and to generate the index signal if the address data so corresponds;
  a translator to translate the index signal into one or more parameters of a low-power instruction; and
  a combiner to generate the low-power instruction by combination of the one or more parameters and the non-address data of the memory-access instruction.

4. The apparatus of claim 3, wherein the set of one or more memory addresses comprises a sequence of memory addresses, and wherein at least first and second values define the sequence of memory addresses.

5. The apparatus of claim 4, wherein the first value comprises the base pointer value indicating a first memory address of the sequence, and wherein the second value comprises the range value indicating a number of memory addresses in the sequence.

6. The apparatus of claim 5, wherein the base pointer value comprises a level two base pointer value, and wherein the range value comprises a C-state range value.

7. The apparatus of claim 3, wherein the one or more parameters of the low-power instruction is determined based on the address data.

8. The apparatus of claim 1, wherein the instruction generator is to receive the memory-access instruction having the address data corresponding to a memory address that represents a low-power state.

9. The apparatus of claim 1, wherein the instruction generator is to translate the address data of the memory-access instruction into a low-power instruction responsive to receipt of the memory-access instruction if the address data is within the address range, wherein the low-power instruction is to cause the apparatus to enter a low power state, and otherwise to select the memory-access instruction.

10. A method comprising:
  receiving a memory-access instruction including address data; and
  translating the address data of the memory-access instruction into a low-power instruction responsive to receiving the memory-access instruction if the address data is within an address range, including:
  comparing the address data to a sequence of memory addresses representing one or more low-power instructions;
  generating an index signal to be coupled to a table that includes a set of parameters for the one or more low-power instructions, the index signal having a value corresponding to one of a set of index values stored in the table based on the comparison;
  translating the index signal into one or more parameters of the low-power instruction using the table; and
  generating the low-power instruction by combining the one or more parameters and non-address data of the memory-access instruction;
  wherein the low-power instruction is to cause a processor to enter a low power state, and otherwise selecting the memory-access instruction.

11. The method of claim 10, wherein receiving the memory-access instruction comprises receiving an input/output mapped instruction for accessing a memory address of a memory.

12. The method of claim 10, wherein at least first and second values define the sequence of memory addresses.

13. The method of claim 12, wherein the first value includes a first memory address of the sequence, and the second value includes a number of memory addresses in the sequence.

14. The method of claim 10, wherein one or more parameters of the low-power instruction is determined based on the address data.

15. The method of claim 10, wherein the address data corresponds to a memory address that represents a desired low-power state.

16. A system comprising:
  a processor including an instruction generator to receive a memory-access instruction including address data and non-address data and translate the address data of the memory-access instruction into a low-power instruction responsive to receipt of the memory-access instruction if the address data is within an address range defined by a base pointer value and a range value, wherein the low-power instruction is to cause the processor to enter a low power state, and otherwise to select the memory-access instruction, and a core coupled to the instruction generator to receive the low-power instruction or the memory-access instruction from the instruction generator and to execute the received low-power instruction or memory-access instruction, the instruction generator including a controller to compare the address data to address data of a set of one or more memory addresses corresponding to one or more low-power instructions, and to generate an index signal having a value corresponding to one of a set of index values stored in a table that includes a set of low-power instruction parameters identified by the set of index values based on the comparison, a translator to translate the index signal into one or more parameters of the low-power instruction using the table, and a combiner to generate the low-power instruction by combination of the one or more parameters and the non-address data of the memory-access instruction; and
  a dynamic random access memory (DRAM) coupled to the processor and including operating system instructions.

17. The system of claim 16, wherein execution of the operating system instructions results in an operating system application that is to generate the memory-access instruction.

18. The system of claim 16, wherein the memory-access instruction is an input/output read instruction including the address data corresponding to a power management operation.

19. The system of claim 16, wherein the set of one or more memory addresses comprises a sequence of memory addresses, and wherein at least first and second values define the sequence of memory addresses, and wherein the first value comprises the base pointer value indicating a first memory address of the sequence, and wherein the second value comprises the range value indicating a number of memory addresses in the sequence.

20. The system of claim 16, wherein the instruction generator further includes a selector to receive a first signal corresponding to the memory-access instruction and a second signal from the combiner corresponding to the low-power instruction and to select one of the memory-access instruction and the low-power instruction for output to the core under control of the controller.

* * * * *